United States Patent
Schetzel

(10) Patent No.: US 11,692,669 B2
(45) Date of Patent: Jul. 4, 2023

(54) OIL TANK FILLER CAP INTEGRATED INTO THE DE-AERATOR

(71) Applicant: Rolls-Royce Corporation, Indianapolis, IN (US)

(72) Inventor: Douglas Schetzel, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 645 days.

(21) Appl. No.: 16/692,811

(22) Filed: Nov. 22, 2019

(65) Prior Publication Data

US 2021/0156515 A1    May 27, 2021

(51) Int. Cl.
| | |
|---|---|
| *F16N 39/00* | (2006.01) |
| *B01D 19/00* | (2006.01) |
| *F02C 7/06* | (2006.01) |
| *F01M 11/00* | (2006.01) |
| *F01M 11/04* | (2006.01) |

(52) U.S. Cl.
CPC ....... *F16N 39/002* (2013.01); *B01D 19/0057* (2013.01); *F01M 11/0004* (2013.01); *F01M 11/04* (2013.01); *F02C 7/06* (2013.01); *F05D 2260/98* (2013.01)

(58) Field of Classification Search
CPC .............. F16N 39/002; F16N 2210/02; F16N 2210/08; B01D 19/0057; F01M 11/0004; F01M 11/04; F02C 7/06; F05D 2260/98; F05D 2260/608; F05D 2260/609; Y02T 50/60
See application file for complete search history.

(56) References Cited

U.S. PATENT DOCUMENTS

| | | | |
|---|---|---|---|
| 3,771,287 A | 11/1973 | Sunderland | |
| 9,850,779 B2 | 12/2017 | Gatto et al. | |
| 10,060,289 B2 | 8/2018 | Sheridan | |
| 10,208,637 B2 | 2/2019 | Mulock | |
| 2015/0202548 A1* | 7/2015 | Butt | F01D 25/18 96/155 |
| 2016/0017812 A1 | 1/2016 | Sheridan | |
| 2016/0229287 A1* | 8/2016 | Xu | F01D 25/18 |
| 2019/0063330 A1 | 2/2019 | Sheridan | |
| 2019/0292944 A1 | 9/2019 | Mason et al. | |

OTHER PUBLICATIONS

Article, *Flight Mechanic*, "Turbine Lubrication System Components—Oil Tank," http://www.fliqht-mechanic.com/turbine-lubrication-system-components-oil-tank/, Sep. 18, 2019, 3 pp.

* cited by examiner

*Primary Examiner* — Jacob M Amick
*Assistant Examiner* — Charles J Brauch
(74) *Attorney, Agent, or Firm* — Crowell & Moring LLP

(57) ABSTRACT

An oil tank assembly for a gas turbine engine may include an oil tank having an upper compartment and a lower compartment. A baffle may separate the upper compartment of the oil tank from the lower compartment of the oil tank. A de-aerator may be included, where the de-aerator includes an oil inlet, a de-aerator outlet, and an air vent. The de-aerator may be configured to separate air from oil in an air-oil mixture such that the oil flows through the de-aerator outlet and such that the air flow through the vent. Further, the de-aerator may include a fill port for receiving oil.

20 Claims, 8 Drawing Sheets

US 11,692,669 B2

OIL TANK FILLER CAP INTEGRATED INTO THE DE-AERATOR

TECHNICAL FIELD

This disclosure relates to a lubrication system (such as for gas turbine engines), and, in particular to a deaerator with an integrated oil tank filler cap.

BACKGROUND

Gas turbine engines often have oil tanks with baffles to keep oil in the bottom of the oil tanks. These gas turbine oil tanks have a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

By way of an introductory example, an oil tank assembly for a gas turbine engine may include an oil tank having an upper compartment and a lower compartment. A baffle may separate the upper compartment of the oil tank from the lower compartment of the oil tank. A de-aerator may be included, where the de-aerator includes an oil inlet, a de-aerator outlet, and an air vent. The de-aerator may be configured to separate air from oil in an air-oil mixture such that the oil flows through the de-aerator outlet and such that the air flow through the vent. Further, the de-aerator may include a filler port for receiving oil.

One interesting feature of the oil tank assembly described herein may be that oil filled through the deaerator may flow directly into a lower compartment of the oil tank located below a baffle, which may increase the time and efficiency of particular maintenance steps relate to other embodiments. Further, incorporating a filler port within a deaerator as described herein may limit the amount of holes and/or other features cut into a tank material, which may provide an oil tank with relatively high strength and durability. Valuable space inside the housing of the gas turbine engine may also be saved using the present embodiments, thereby opening up space for other components and/or reducing the overall size and weight of the gas turbine engine.

Figure 1:
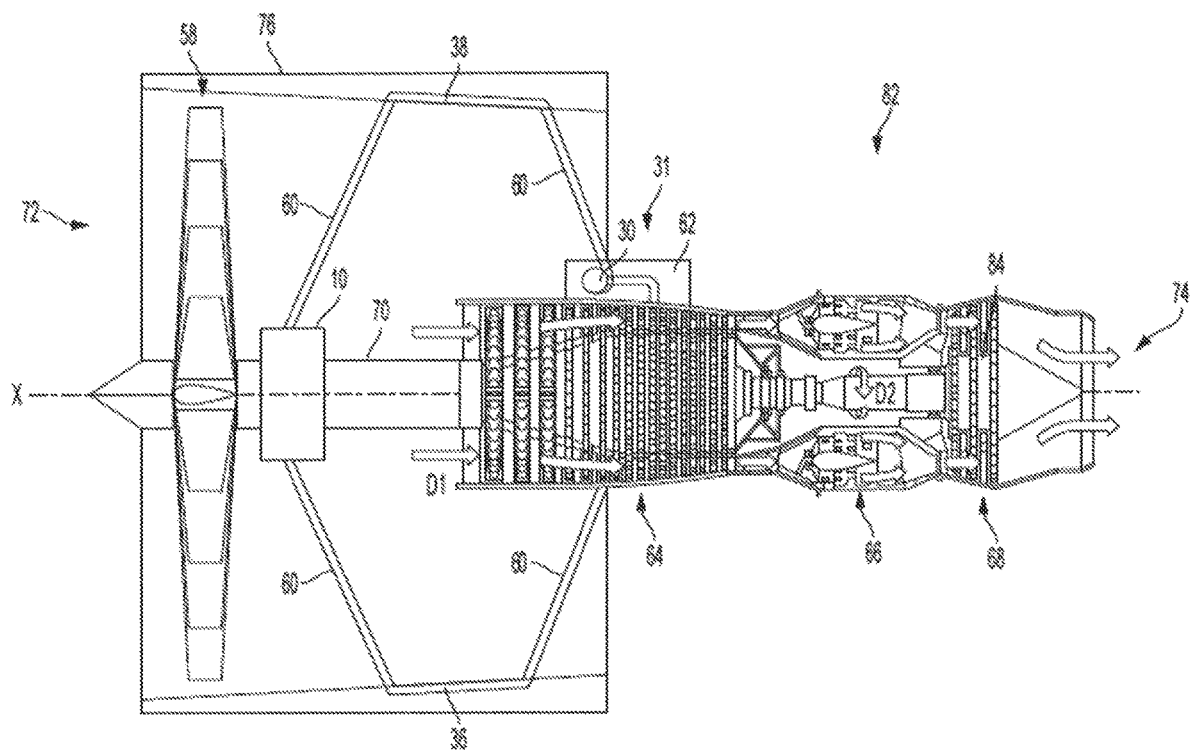
FIG. 1 illustrates a cross-sectional view of an example of a gas turbine engine.

FIG. 1 is a cross-sectional view of a gas turbine engine 82. In some examples, the gas turbine engine 82 may supply power to and/or provide propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively or in addition, the gas turbine engine 82 may be utilized in a configuration unrelated to an aircraft such as, for example, an industrial application, an energy application, a power plant, a pumping set, a marine application (for example, for naval propulsion), a weapon system, a security system, a perimeter defense or security system.

The gas turbine engine 82 may take a variety of forms in various embodiments. Though depicted as an axial flow engine, in some forms the gas turbine engine 82 may have multiple spools and/or may be a centrifugal or mixed centrifugal/axial flow engine. In some forms, the gas turbine engine 82 may be a turboprop, a turbofan, a geared turbofan, or a turboshaft engine. Furthermore, the gas turbine engine 82 may be an adaptive cycle and/or variable cycle engine. Other variations are also contemplated.

The gas turbine engine 82 may include an intake section 72, a compressor section 64, a combustion section 66, a turbine section 68, and an exhaust section 74. During operation of the gas turbine engine 82, fluid received from the intake section 72, such as air, travels along the direction D1 and may be compressed within the compressor section 64. The compressed fluid may then be mixed with fuel and the mixture may be burned in the combustion section 66. The combustion section 66 may include any suitable fuel injection and combustion mechanisms. The hot, high pressure fluid may then pass through the turbine section 68 to extract energy from the fluid and cause a shaft 70 of a turbine 84 in the turbine section 68 to rotate, which in turn drives the compressor section 64. Discharge fluid may exit the exhaust section 74.

As noted above, the hot, high pressure fluid passes through the turbine section 68 during operation of the gas turbine engine 82. As the fluid flows through the turbine section 68, the fluid passes between adjacent blades of the turbine 84 causing the shaft 70 to rotate. The rotating turbine 84 may turn a shaft 70 in a rotational direction D2, for example. The shaft 70 may rotate around an axis of rotation, which may correspond to a centerline X of the turbine 84 in some examples.

The gas turbine engine 82 may also include a turbofan 58 (or alternatively a turboprop, not shown) located upstream from the compressor section 64. The turbofan 58 may receive fluid from the intake section 72 and direct it downstream. A portion of the fluid passing through the turbofan 58 may enter the compressor section 64 while another portion of the fluid may bypass the compressor section 64. To better direct fluid passing through the turbofan 58, the turbofan may be surrounded by a shroud 76. The shroud 76 may be a component which encircles the turbofan 58. Examples of the shroud 76 may include a duct or a cylindrical shell. The shroud 76 may extend over other portions of the gas turbine engine 82, such as the compressor section 64.

The turbofan 58 may be coupled to the shaft 70 through a gearbox 10 (e.g., where the gearbox 10 includes an output shaft fixed to the turbofan 58. The gearbox 10 may be any component which mechanically transforms rotations D2 of the shaft 70 into rotations of the turbofan 58. Examples of the gearbox 10 may include a coaxial helical inline gearbox, a bevel helical gearbox, or a planetary gearbox (also known as an epicyclic gear train). The turbofan 58, shroud 76, and gearbox 10, may be supported by struts 60 coupled to different points of the gas turbine engine 82. For example, as illustrated in FIG. 1, the struts may extend between the gearbox 10 and the shroud 76, and between the shroud 75 and the compressor section 64. The struts 60 may extend between other portions of the gas turbine engine 82 as well.

Figure 2:
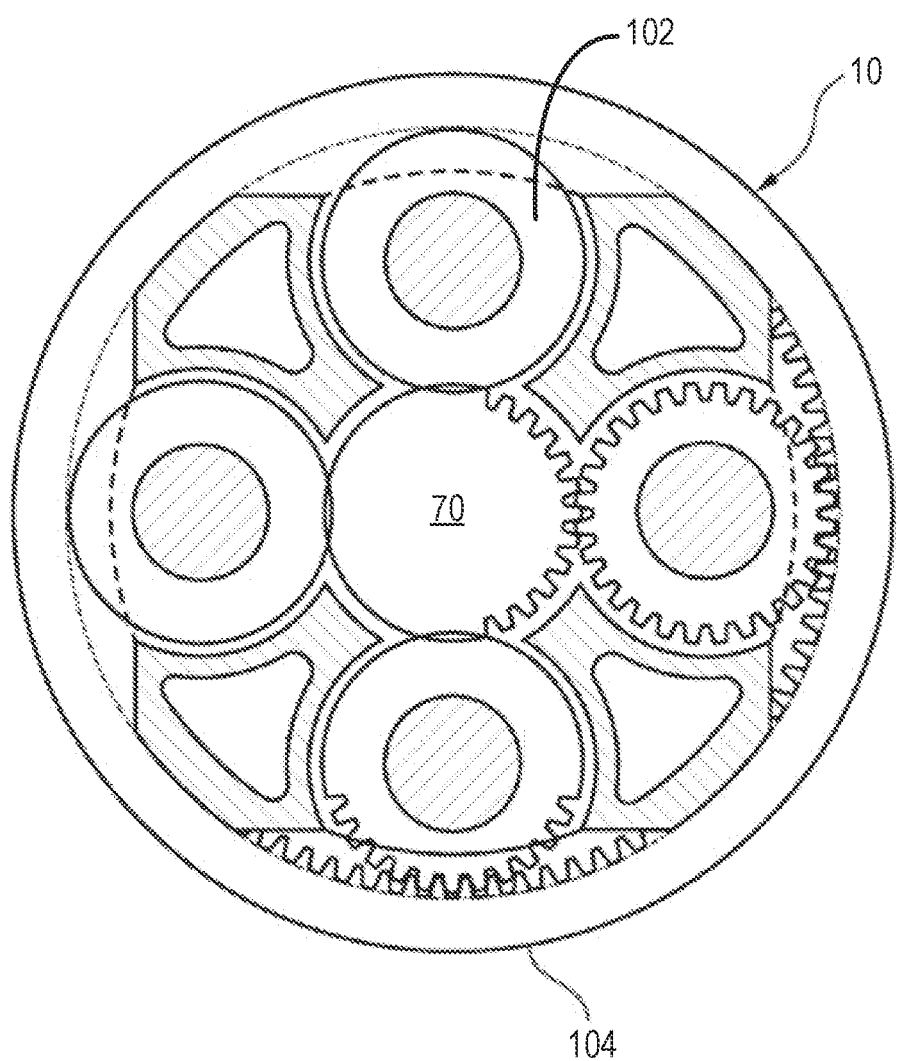
FIG. 2 illustrates a cross-sectional view of an example of a gearbox for the gas turbine engine of FIG. 1.

FIG. 2 illustrates a cross-sectional view of the gearbox 10. The gearbox 10 may include a plurality of gears 102 which rotate in response to the rotation of the shaft 70. The gears 102 may be any object which is capable of mechanically transferring rotation of one component to another component. For example, the gears 102 may transfer the rotation of the shaft 70 to a rotation of the turbofan 58 depicted in FIG. 1. Non-limiting examples of the gears 102 may include spur gears, helical gears, or herringbone gears forming a planetary gear train. The plurality of gears 102 may rotate a ring gear 104 which encircles the plurality of gears 102. The ring gear 104 may be any component which, through interaction with the plurality of gears, rotates at a reduced rate compared to the rotation of the shaft 70. Examples of the ring gear 104 may include a spur ring gear, a helical ring gear, or a herringbone ring gear. The ring gear 104 may be included in other embodiments of the gearbox 10. Several examples of non-limiting gearbox embodiments are shown in U.S. application Ser. No. 16/293,790, filed Mar. 6, 2019, and entitled EMBEDDED AUXILIARY OIL SYSTEM FOR GEARBOX PROTECTION, which is hereby incorporated by reference in its entirety.

Figure 3:
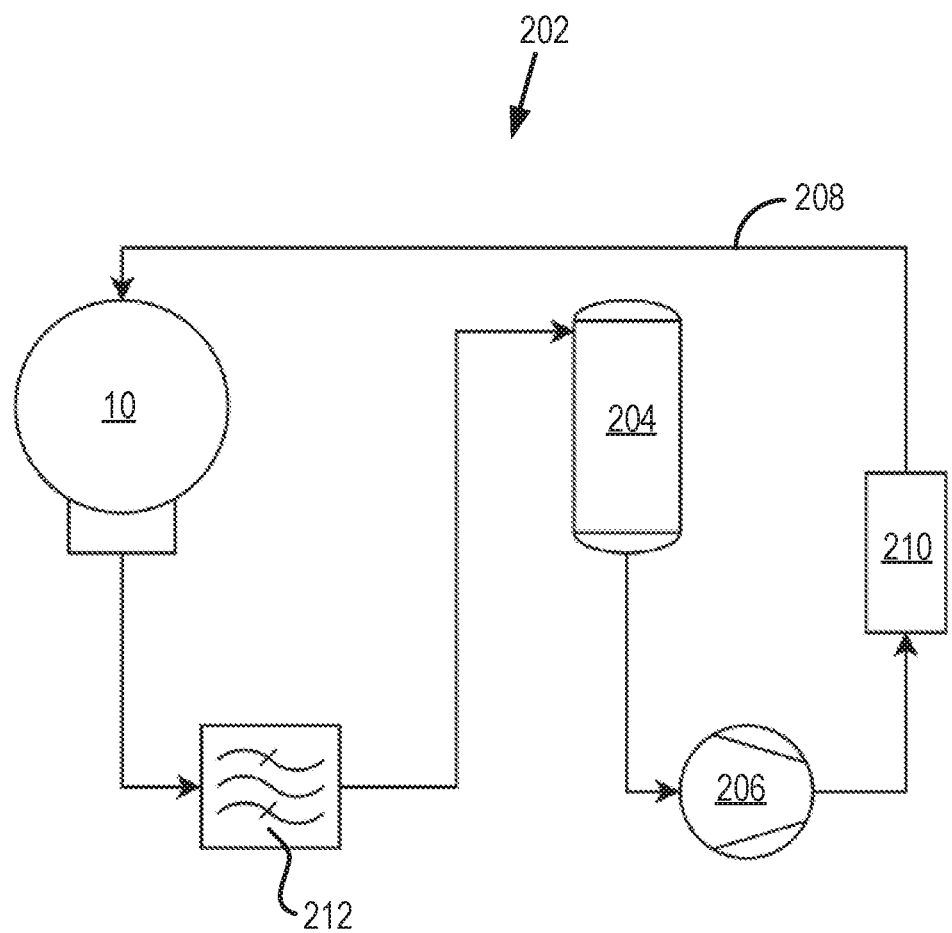
FIG. 3 illustrates a diagram of an embodiment of a lubrication system for lubricating and/or cooling the gearbox of FIG. 2.

FIG. 3 illustrates a flow diagram of an exemplary lubrication system 202 for the gas turbine engine 82 of FIG. 1. Referring to FIG. 3, the lubrication system 202 may include a variety of components related to lubrication and cooling of certain components of the gas turbine engine 82. For example, the lubrication system 202 may primarily function to cool the gearbox 10, but additional (or alternative) components may be cooled and/or lubricated by the lubrication system 202. Optionally, the lubrication system 202 may have one or more auxiliary lubrication circuits, such as the "auxiliary oil system" shown in FIG. 4 of U.S. patent application Ser. No. 16/283,085, filed Mar. 21, 2018, and entitled "OIL SYSTEM," which is hereby incorporated by reference in its entirety.

Without limitation, the lubrication system 202 may include an oil tank 204 that supplies oil (or another lubrication fluid) to an oil pump 206. The oil pump 206 may be configured (e.g., designed, sized, and located) for causing a circulation of an oil through the lubrication system 202. The oil pump 206 may include any suitable design and structure for circulating the oil. For example, the oil pump 206 may include a fixed displacement pump, a variable displacement pump (such as a rotary vane pump, a piston pump, or a centrifugal pump), etc. In certain exemplary embodiments, the oil pump 206 is driven by the gearbox 10.

The oil pump 206 may move the oil through a series of pipes or tubes (e.g., piping 208) to a heat exchanger or oil cooler 210, which may include a heat exchanger for removing heat from the oil and transferring it elsewhere. As will be appreciated by those with ordinary skill in the art, the oil cooler 210 may be located at a different location within the circuit of the lubrication system 202. For example, the oil cooler 210 may be located immediately upstream or downstream of the gearbox 10, between a filter 212 and the oil tank 204, etc. In some embodiments, more than one oil cooler 210 may be included.

After exiting the oil cooler 210 in the depicted embodiment, the oil may then flow through the piping 208 and into the gearbox 10, thereby providing cooling and/or lubrication to certain critical components within the gearbox 10, such as (but not limited to) gears, bearings, and/or any other contact-based mechanical components. A continuous flow of the oil may be provided to the gearbox 10 such that the gearbox 10 is adequately lubricated and cooled. As relatively cool oil enters the gearbox 10, the oil may leave the gearbox 10 in a heated state and then enter the optional filter 212 prior to returning to the oil tank 204.

Figure 4:
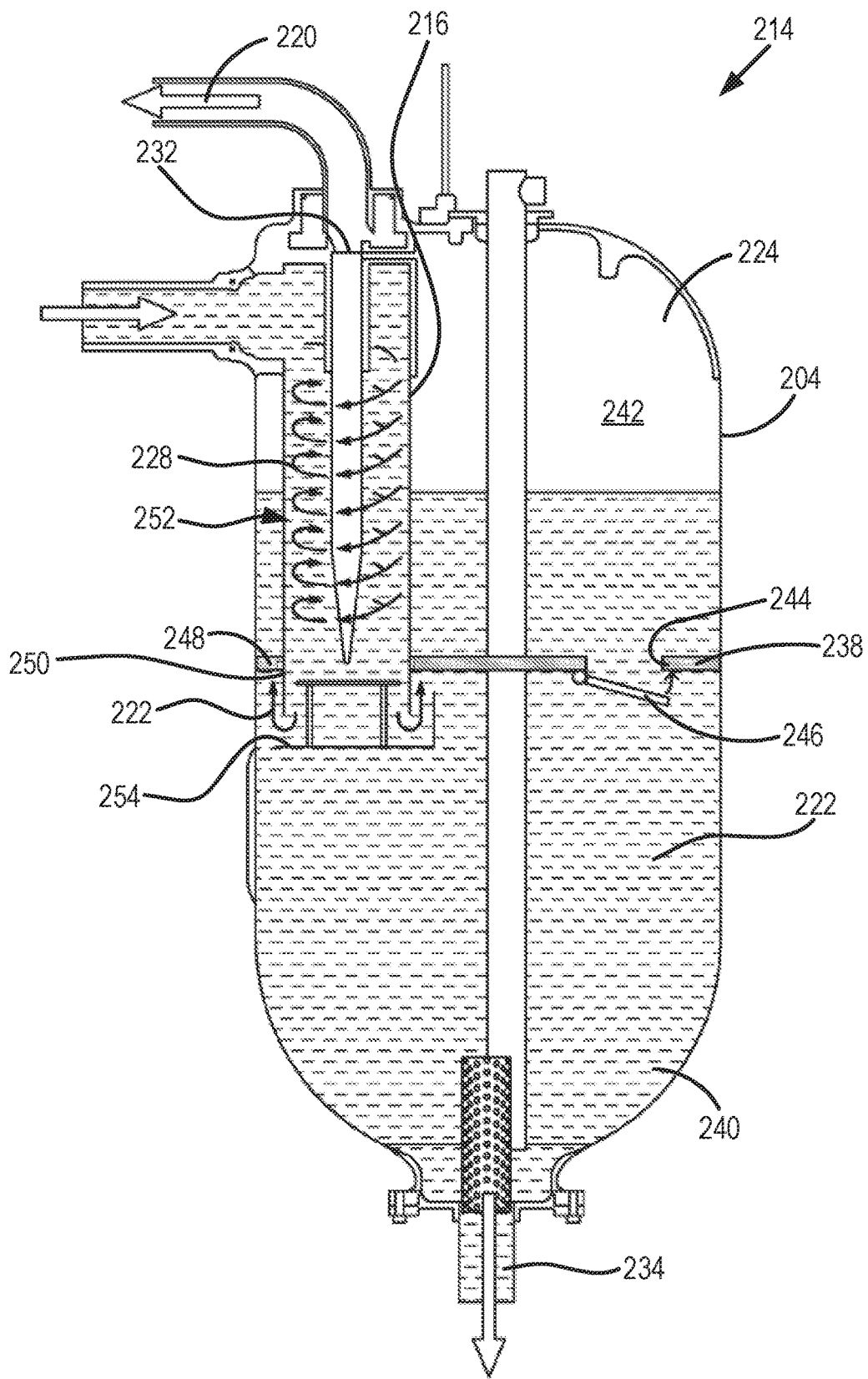
FIG. 4 illustrates a cross-sectional view of an oil tank assembly including a deaerator for use with a lubrication system for a gas turbine engine.

FIG. 4 illustrates an oil tank assembly 214 that includes the oil tank 204 (which may be used with the embodiment of the lubrication system 202 of FIG. 3, for example). Referring to FIG. 4, the oil tank assembly 214 may include a deaerator 216 (which also may be referred to as an "air oil separator" or "breather"). The deaerator 216 may be a device that removes a majority of air 220 from an oil 222 flowing into the oil tank 204 (e.g., where the oil 222 enters the tank 204 as an aerated oil or air-oil mix due to action of the oil pump 206 shown in FIG. 3). The deaerator 216 may be desirable to ensure that the oil 222 is in a suitable (e.g., non-aerated) state for entering a reservoir 224 of the oil tank 204 and then circulating out of the oil tank 204 and to downstream components of the lubrication system 202. The de-aeration process may be achieved by inducing a vortex 228 within the oil flow. Due to the oil particles having a higher mass density (and thus a higher centrifugal inertial force within the vortex), the vortex 228 causes the liquid particles of the oil 222 to separate from the air 220. The air 220 may then be released from the deaerator 216 by an air vent 232, while the deaerated oil 222 passes out of the deaerator 216 and into the reservoir 224 of the oil tank 204. The oil 222 may be stored in the reservoir 224 (e.g., at the bottom) until it is pumped out of a tank outlet 234 and towards downstream components of the lubrication system 202.

As shown in FIG. 4, the oil tank 204 may include at least one baffle 238. The baffle 238 may extend horizontally to compartmentalize the reservoir 224 such that it has a lower compartment 240 that is at least partially separated from an upper compartment 242. More than two compartments may be included in certain embodiments (but only two are depicted in FIG. 4). The tank outlet 234 (e.g., an opening for outflow of the oil 222 due to gravity, a sump pump inlet and/or other type of sump for the outflow of the oil 222, etc.) may be arranged in the lower compartment 240. Thus, when the gas turbine engine is upright, oil 222 may be located in (and perhaps fill) the lower compartment 240 of the reservoir 224 due to gravity since the lower compartment 240 is located at the bottom of the reservoir 224. If an amount of oil 222 is included that fills, and overflows, the lower compartment 240, a portion of the oil 222 may be located above the baffle 238 in the upper compartment 242.

Oil 222 located above the baffle 238 may flow from the upper compartment 242 to the lower compartment 240 through a baffle opening 244. Optionally, the baffle opening 244 may be configured to provide one-way flow from the upper compartment 242 to the lower compartment 240 via a valve (e.g., such as a flapper valve 246) or another suitable device. Advantageously, the flapper valve 246, which may normally be open as shown (e.g., absent external forces), may close only when the oil in the lower compartment 240 of the oil tank 204 would otherwise move from the lower compartment 240 and into the upper compartment 242 due to aircraft acceleration, rotation of the aircraft (e.g., during certain flight maneuvers), etc. In other words, the flapper valve 246 ensures oil 222 is appropriately located in the lower compartment 240 during aircraft operation such that the tank outlet 234 does not run dry.

In the depicted embodiment, the baffle 238 includes a second baffle opening 248 that is configured (e.g., sized, shaped, and located) for receipt of a lower portion 250 of the deaerator 216. For example, the second baffle opening 248 may have a diameter that is approximately the same size as an outer diameter of the deaerator 216. Optionally, an O-ring or other suitable seal may function to prevent the oil 222 from moving through the second baffle opening 248 when the deaerator 216 is installed through the baffle 238, but this is not required. When the O-ring or other sealing device is included, at least one of the second baffle opening 248 and an outer diameter surface 252 of the deaerator 216 may include a groove or other surface structure for providing a seat for the O-ring. It is also contemplated that the second baffle opening 248 may be threaded to correspond with male threads on the outer diameter surface 252 of the deaerator 216, but this is not shown (and not required).

Since the lower portion 250 of the deaerator 216 extends through the baffle 238, a deaerator outlet 254 is located beneath the baffle 238 and in the lower compartment 240 of the reservoir 224. Advantageously, de-aerated oil 222 may directly flow into the lower compartment 240 such that it is properly positioned for flowing out of the tank outlet 236 of the oil tank 204 (e.g., without the need for flowing through the baffle opening 244. This may allow the oil 222 to flow through the oil tank 204 with a faster flow rate relative to other embodiments, which may allow a smaller oil tank 204 to be used without the risk of the lower compartment 240 running dry. This feature may save material and labor costs, reduce the weight of the oil tank 204 (and therefore the gas turbine engine 82) relative to other embodiments, and may save valuable space within the housing of the gas turbine engine 82.

The oil tank 204 may be formed of any suitable material (or a combination of different materials). For example, one or more metals (perhaps lined with an anti-corrosion material) may be used to form the walls of the oil tank 204. In the present embodiment, the oil tank 204 is preferably formed with a composite material, including carbon fiber and BMI resin, which may be relatively light when compared to other suitable materials. Other such composite materials may be used, as would be appreciated by the skilled person (e.g., such as material consisting of any of a wide range of synthetic or semi-synthetic compounds that are malleable and so can be molded into solid objects, such as plastics). Similarly, the deaerator 216 may be formed of any suitable material, such as a metal material and/or a composite material. In certain embodiments, it may be advantageous to form the deaerator 216 with a different material than the primary material of the oil tank 204 (e.g., the deaerator 216 may include a metal material for sufficient strength and rigidity, while the walls of the oil tank 204 may include a composite material for relatively low weight).

Figure 5:
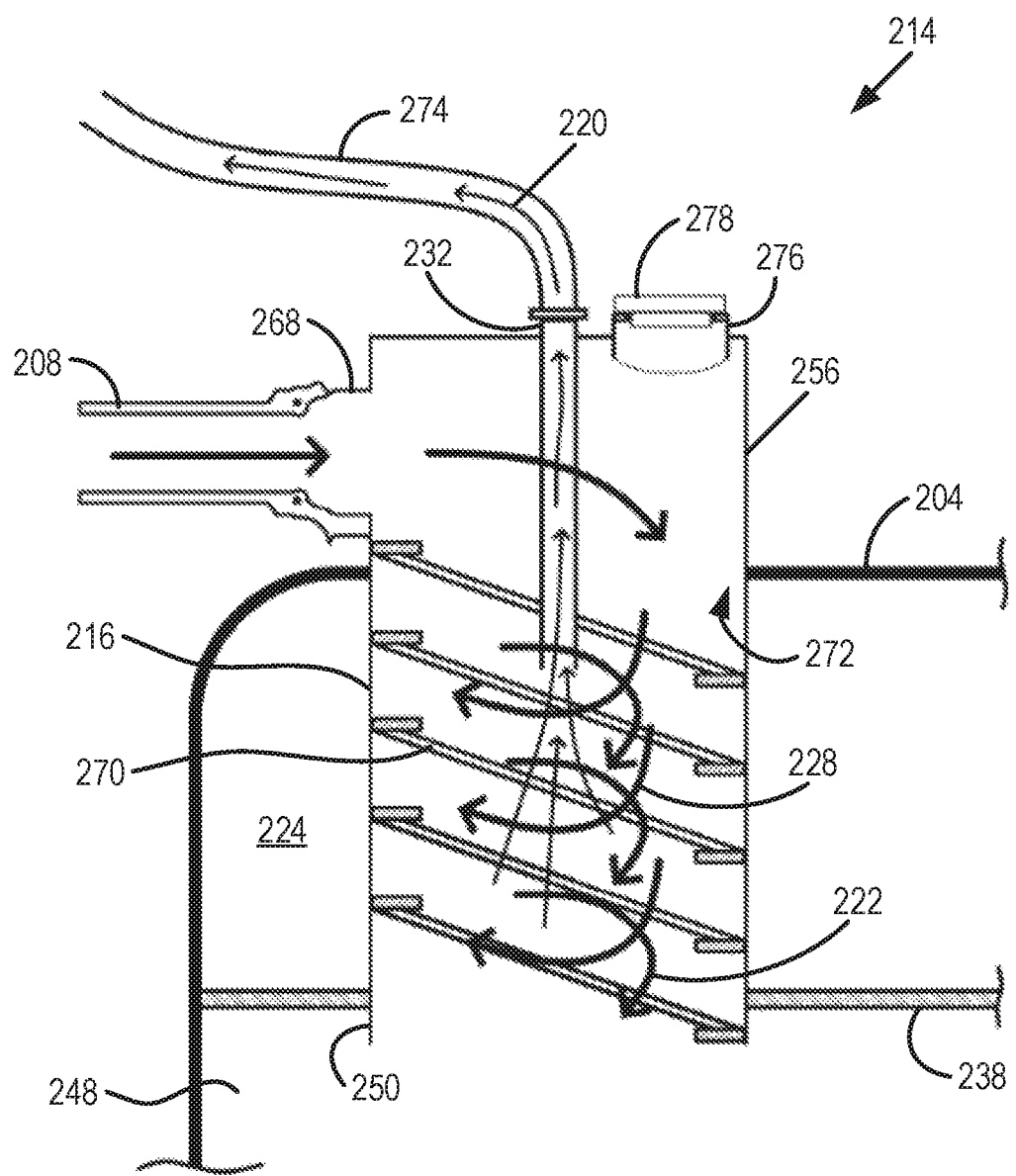
FIG. 5 illustrates a cross-sectional view of an embodiment of an aerator incorporated into an oil tank assembly.

FIG. 5 illustrates an embodiment of a deaerator 216 that is installed in an oil tank 204, which may be used with any of the preceding embodiments. As shown, an upper portion 256 of the deaerator 216 may be located outside the reservoir 224 of the oil tank 204 (e.g., such that it is accessible from a location outside the oil tank 204). A deaerator inlet 268 provides fluid communication between the piping 208 (which may direct oil into the deaerator 216 from a pump, as discussed above). As discussed above, the deaerator 216 may receive an air-oil mixture through the deaerator inlet 268, and may function to separate the air 220 from the oil 222 with the use of a vortex 228. The vortex 228 may be accomplished with any suitable device or structure, such as with one or more scrolls or spirals 270 located on an inner wall surface 272 of the deaerator 216, as shown.

The deaerator inlet 268 is positioned outside the oil tank 204, which may advantageously enhance the accessibility of the deaerators inlet 268 (e.g., for ease of installation/assembly, maintenance, etc.). Similarly, an air vent 232 and associated ventilation tubing 274 engage the upper portion 256 of the deaerator. As discussed above, the air vent 232 may direct the air 220 that is separated from the oil 222 out of the deaerator 216 (e.g., through the depicted ventilation tubing 274). The deaerated oil 222 may continue through the lower portion 250 of the deaerator 216 such that it flows into the lower compartment 240 of the oil tank 204 (e.g., beneath the baffle 238).

As shown in FIG. 5, the deaerator 216 may include a filler port 276, which may typically be closed and plugged by a filler cap 278 (as depicted). The filler port 276 may be accessible by maintenance personnel (e.g. via removal of the filler cap 278) such that the maintenance personnel can pour oil into the filler port 276 as needed (e.g., when the gas turbine engine 82 is undergoing a change of oil and/or the oil level is low for another reason).

Figure 6:
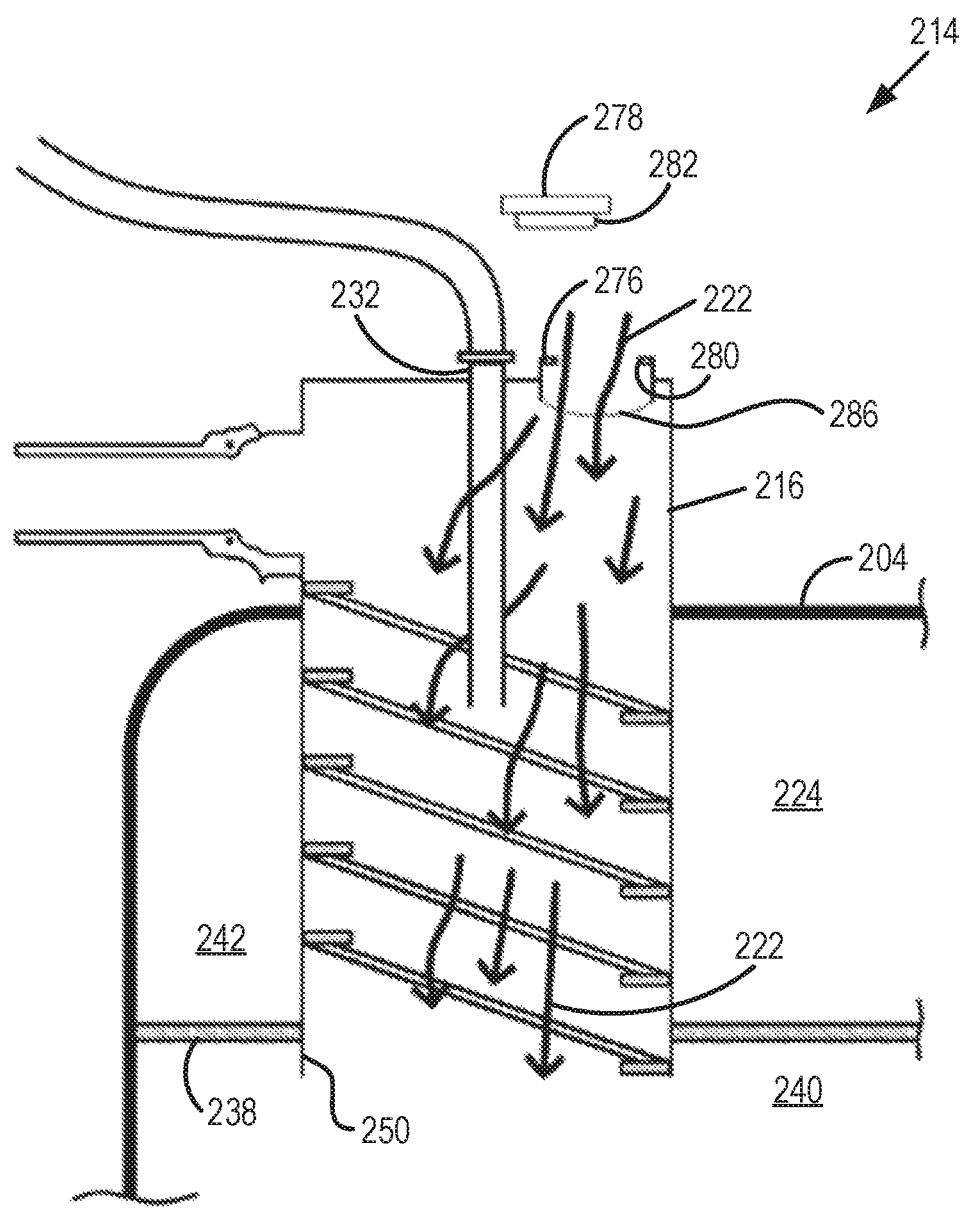
FIG. 6 illustrates a cross-sectional view of the aerator of FIG. 5 where a filler cap is moved from a filler port.

FIG. 6 illustrates the embodiment of FIG. 5, where the filler cap 278 is removed from the filler port 276. When the filler cap 278 is removed, the filler port 276 provides access to the reservoir 224 of the oil tank 204 such that it can be filled with oil 222 (and/or for another function, such as oil removal, air removal, etc.). While the filler port 276 may have any suitable size and shape, it may be advantageous for the filler port 276 to have a circular cross-section with female threads 280 that correspond with male threads 282 of the filler cap 278. At least one of the filler port 276 and the filler cap 278 may include an O-ring or other sealing device (not shown) for providing a fluid-tight connection when the filler cap 278 is secured in a closed state. While any suitable diameter is contemplated for the filler port 276, the diameter may be between about 1½ inches and about 4 inches in certain exemplary embodiments (e.g., such that the diameter corresponding to known filling devices, such as common funnels). This diameter may be relatively large when compared to the opening defining the air vent 232 (which may be smaller to save space, such as having a diameter of less than about 2 inches, less than 1 inch, less than ½ inch, etc.).

A fluid-permeable screen 286 may cover the filler port 276 to prevent unintended objects from entering the oil tank 204 through the filler port 276 (such as small tools, bolts, dust or other unwanted solid particles, etc.). Since the lower portion 250 of the deaerator 216 extends to a location beneath the baffle 238, filling the oil 222 through the deaerator 216 may be desirable since the oil 222 may directly fill the lower compartment 240 of the oil tank 204. This feature may increase the speed of an oil change or oil fill, particularly when the oil level is most accurately determined when the lower compartment 240 is fully filled with the oil 222. For example, unlike other embodiments, the maintenance personnel will not have to wait for the oil 222 to drain from the upper compartment 242 to the lower compartment 240 of the oil tank 204 (through the baffle 238) when adding oil to the present embodiment before determining whether the oil level is sufficient, as the oil 222 directly flows into the lower compartment 240. Further, since the lower compartment 240 is filled directly, there is no risk of operating the gas turbine engine 82 too early after an oil change (e.g., before a sufficient amount of oil can drain from the upper compartment 242 to the lower compartment 240.

Another advantage of the present embodiment is that the number of holes or openings drilled through the wall material of the oil tank 204 is reduced relative to other embodiments. For example, since the filler port 276 is incorporated into the deaerator 216, a separate opening for a filler port does not need to be cut through the walls of the oil tank 204. This feature may provide an oil tank 204 that has a high degree of structural integrity and durability, and it may increase the manufacturing efficiency of the oil tank 204. Further, incorporating the filler port 276 within the deaerator 216 may save space relative to other embodiments, as the exterior of the oil tank 204 does not need to include a separate opening devoted to a filler port 276 requiring access by separate filler tubing/piping. Further, during assembly of the lubrication system, any piping/tubing needed for the filler port 276 may be coupled to the deaerator 216 at an external location on the assembly floor (or elsewhere) prior to being coupled to the remainder of the oil tank assembly 214, which may increase the efficiency of the assembly process. Similarly, since the deaerator 216 allows newly-filled oil 222 to flow to a location below the baffle 238, the baffle 238 does not require a separate opening devoted to directing oil from a fill port to the lower compartment 240 with separate tubing, for example.

Figure 7:
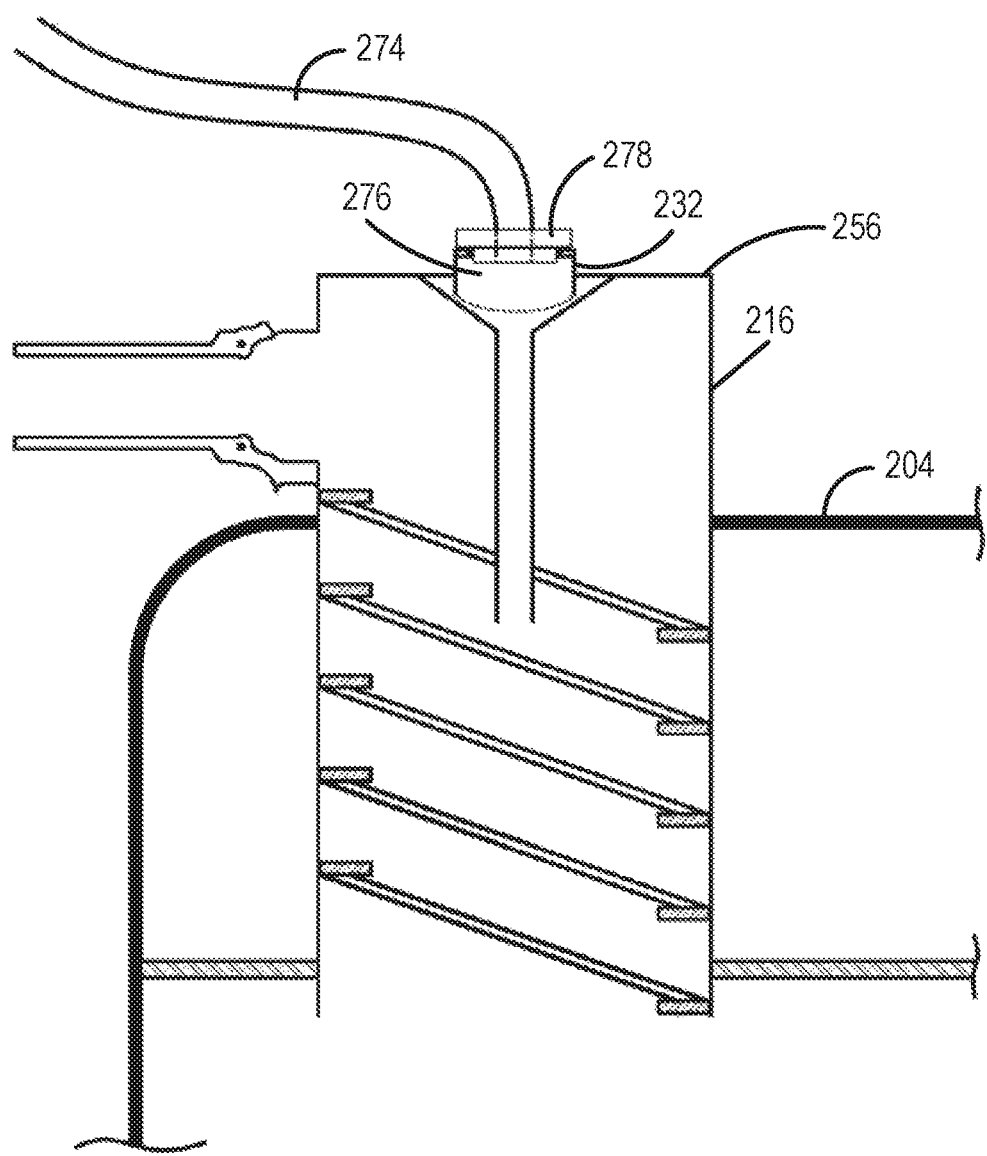
FIG. 7 illustrates a cross-sectional view of a second embodiment of an aerator incorporated into an oil tank assembly.

As shown in FIG. 7, the filler port 276 may be incorporated into the opening defining the air vent 232 on the upper portion 256 of the deaerator 216 such that it is outside the oil tank 204 (as it may be difficult to access otherwise). Advantageously, such an embodiment may save space, as a portion of the exterior surface area of the deaerator 216 does not need to be devoted to accommodating a filler port 276. The ventilation tubing 274 may be directly coupled to the filler cap 278 in this embodiment, thereby saving an assembly step since the filler cap 278 and the ventilation tubing 274 may be coupled to the deaerator 216 with a single connection (but other arrangements are also contemplated). Other locations of the filler port 276 are also contemplated, and in-particular, the filler port 276 may be located at any location corresponding to the upper portion 256 of the deaerator (e.g., outside the oil tank 204) in certain exemplary embodiments.

Figure 8:
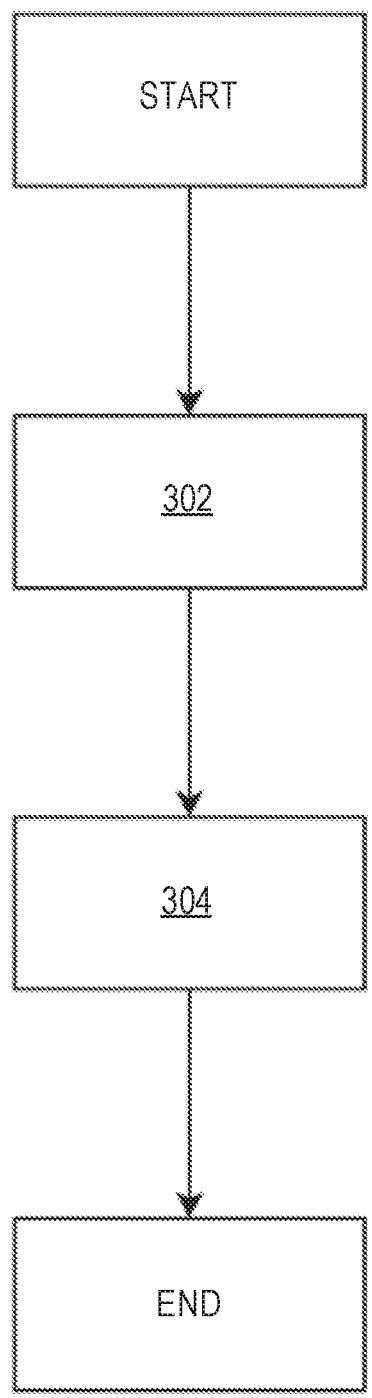
FIG. 8 illustrates a method for guiding oil through a deaerator and into an oil tank of a gas turbine engine.

FIG. 8 illustrates a method for filling an oil tank of a gas turbine engine with oil, in accordance with the embodiments discuss above (and potential modifications thereof). A first step 302 may include pouring an oil through a filler port, where the filler port is included on an upper portion of a deaerator (e.g., in accordance with at least one of FIGS. 4-6). As discussed above, a lower portion of the deaerator may be located below a baffle of the oil tank such that oil poured through the filler port flows directly to a lower compartment of the oil tank located below the baffle. In a second step 304, a filler cap from the filler port may be removed (e.g., prior to pouring the oil through the filler port), wherein the filler cap couples directly to the deaerator (e.g., as shown in the embodiments of FIG. 5 and FIG. 6).

The logic illustrated in the flow diagrams may include additional, different, or fewer operations than illustrated. The operations illustrated may be performed in an order different than illustrated.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A 1$^{st}$ aspect relates to an oil tank assembly for a gas turbine engine may include an oil tank having an upper compartment and a lower compartment. A baffle may separate the upper compartment of the oil tank from the lower compartment of the oil tank. A de-aerator may be included, where the de-aerator includes an oil inlet, a de-aerator outlet, and an air vent. The de-aerator may be configured to separate air from oil in an air-oil mixture such that the oil flows through the de-aerator outlet and such that the air flow through the vent. A filler port may be formed by a first opening in an upper portion of the deaerator, where the upper portion of the deaerator is located outside a reservoir of the oil tank, and where the deaerator outlet is located in the lower compartment of the oil tank.

A 2$^{nd}$ aspect relates to the oil tank assembly of aspect 1, where the vent of the deaerator includes a second opening in the upper portion of the deaerator that defines the vent.

A 3$^{rd}$ aspect relates to the oil tank assembly of aspect 2, where the first opening has a diameter that is at least 50% larger than a diameter of the second opening.

A 4$^{th}$ aspect relates to the oil tank assembly of aspect 3, wherein the first opening has a diameter that is between about 1½ inches and about 4 inches.

A 5$^{th}$ aspect relates to the oil tank assembly of any preceding aspect, where the filler cap includes male threads associated with female threads of the filler port.

A 6$^{th}$ aspect relates to the oil tank assembly of any preceding aspect, where the baffle includes a baffle opening for receiving a lower portion of the deaerator.

A 7$^{th}$ aspect relates to the oil tank assembly of aspect 6, where the baffle includes a second opening that includes a valve for allowing one-way flow of oil from the upper compartment to the lower compartment of the oil tank.

An 8$^{th}$ aspect relates to the oil tank assembly of any preceding aspect, where the oil tank is formed of a composite material, and wherein the deaerator is formed of a metal material.

A 9$^{th}$ aspect relates to the oil tank assembly of any preceding aspect, where the upper portion of the oil tank consists of one opening having a diameter greater than ½ inch.

A 10$^{th}$ aspect includes an oil tank assembly for a gas turbine engine. The oil tank assembly may include the following: an oil tank having an upper compartment and a lower compartment; a baffle separating the upper compartment of the oil tank from the lower compartment of the oil tank; a deaerator, where the deaerator includes a deaerator inlet, a deaerator outlet, and a vent, where the deaerator is configured to separate air from oil in an air-oil mixture received by the deaerator inlet such that the oil flows through the deaerator outlet and such that the air flow through the vent, where an upper portion of the deaerator includes a filler port and a removable filler cap, and where the deaerator outlet is located in the lower compartment of the oil tank.

An 11$^{th}$ aspect relates to the oil tank assembly of aspect 10, where the upper portion of the deaerator consists of a single opening with a diameter greater than ½ inch.

A 12$^{th}$ aspect relates to the oil tank assembly of aspect 11, where the single opening accommodates the filler port and the deaerator inlet.

A 13$^{th}$ aspect relates to the oil tank assembly of any of aspects 10-12, where the upper portion of the deaerator includes a first opening defining the filler port and a second opening defining the vent.

A 14$^{th}$ aspect relates to the oil tank assembly of aspect 13, where the first opening has a diameter that is at least 50% larger than a diameter of the second opening.

A 15$^{th}$ aspect relates to the oil tank assembly of aspect 14, where the first opening has a diameter that is between about 1½ inches and about 3½ inches.

A 16$^{th}$ aspect relates to the oil tank assembly of any of aspects 10-15, where the baffle includes a baffle opening for receiving a lower portion of the deaerator.

A 17$^{th}$ aspect relates to the oil tank assembly of any of aspects 10-16, where the oil tank is formed of a composite material, and where the deaerator is formed of a metal material.

An 18$^{th}$ aspect relates to the oil tank assembly of any of aspects 10-17, where the upper portion of the oil tank consists of one opening having a diameter greater than ½ inch.

A 19$^{th}$ aspect relates to a method for filling an oil tank of a gas turbine engine with oil. The oil tank may incorporate any of the aspects described herein, among others.

A 20$^{th}$ aspect relates to the method of aspect 19, where the method further includes removing a filler cap from a filler port prior to pouring oil. The filler cap and/or filler port may incorporate any of the aspects described herein, among other.

I claim:

1. An oil tank assembly for a gas turbine engine, the oil tank assembly comprising: an oil tank having an upper compartment and a lower compartment; a baffle separating the upper compartment of the oil tank from the lower compartment of the oil tank; a deaerator, wherein the deaerator includes a deaerator inlet, a deaerator outlet, and a vent, and wherein the deaerator inlet receives oil circulated by an oil pump, wherein the deaerator is configured to separate air from the oil in an air-oil mixture such that the oil flows through the deaerator outlet and such that the air flow through the vent; and a filler port formed by a first opening in an upper portion of the deaerator wherein the upper portion of the deaerator is located outside a reservoir of the oil tank, and wherein the deaerator outlet is located in the lower compartment of the oil tank and wherein the upper portion of the deaerator consists of a single opening with a diameter greater than ½ inch, and wherein the single opening accommodates the filler port and the deaerator inlet.

2. The oil tank assembly of claim 1, wherein the vent of the deaerator includes a second opening in the upper portion of the deaerator that defines the vent.

3. The oil tank assembly of claim 2, wherein the first opening has a diameter that is at least 50% larger than a diameter of the second opening.

4. The oil tank assembly of claim 3, wherein the first opening has a diameter that is between about 1½ inches and about 4 inches.

5. The oil tank assembly of claim 1, further comprising a filler cap, wherein the filler cap includes male threads associated with female threads of the filler port.

6. The oil tank assembly of claim 1, wherein the baffle includes a baffle opening for receiving a lower portion of the deaerator.

7. The oil tank assembly of claim 6, wherein the baffle includes a second opening that includes a valve for allowing one-way flow of oil from the upper compartment to the lower compartment of the oil tank.

8. The oil tank assembly of claim 1, wherein the oil tank is formed of a composite material, and wherein the deaerator is formed of a metal material.

9. The oil tank assembly of claim 1, wherein the upper portion of the oil tank consists of one opening having a diameter greater than ½ inch.

10. An oil tank assembly for a gas turbine engine, the oil tank assembly comprising:
an oil tank having an upper compartment and a lower compartment;
a baffle separating the upper compartment of the oil tank from the lower compartment of the oil tank;
a deaerator, wherein the deaerator includes a deaerator inlet, a deaerator outlet, and a vent,
wherein the deaerator is configured to separate air from oil in an air-oil mixture received by the deaerator inlet such that the oil flows through the deaerator outlet and such that the air flow through the vent,
wherein an upper portion of the deaerator includes a filler port and a removable filler cap, and
wherein the deaerator outlet is located in the lower compartment of the oil tank; and
wherein the upper portion of the deaerator consists of a single opening with a diameter greater than ½ inch, and
wherein the single opening accommodates the filler port and the deaerator inlet.

11. The oil tank assembly of claim 10, wherein the upper portion of the deaerator includes a first opening defining the filler port and a second opening defining the vent.

12. The oil tank assembly of claim 11, wherein the first opening has a diameter that is at least 50% larger than a diameter of the second opening.

13. The oil tank assembly of claim 12, wherein the first opening has a diameter that is between about 1½ inches and about 3½ inches.

14. The oil tank assembly of claim 10, wherein the baffle includes a baffle opening for receiving a lower portion of the deaerator.

15. The oil tank assembly of claim 10, wherein the oil tank is formed of a composite material, and wherein the deaerator is formed of a metal material.

16. The oil tank assembly of claim 10, wherein the upper portion of the oil tank consists of one opening having a diameter greater than ½ inch.

17. An oil tank assembly for a gas turbine engine, the oil tank assembly comprising:
an oil tank having an upper compartment and a lower compartment;
a baffle separating the upper compartment of the oil tank from the lower compartment of the oil tank;
a deaerator, wherein the deaerator includes a deaerator inlet, a deaerator outlet, and a vent,
wherein the deaerator is configured to separate air from oil in an air-oil mixture received by the deaerator inlet such that the oil flows through the deaerator outlet and such that the air flow through the vent, wherein an upper portion of the deaerator includes a filler port and a removable filler cap, and wherein the deaerator outlet is located in the lower compartment of the oil tank, and wherein a single opening accommodates the filler port and the deaerator inlet.

18. The oil tank assembly of claim 17, wherein the upper portion of the deaerator includes a first opening defining the filler port and a second opening defining the vent.

19. The oil tank assembly of claim 18, wherein the first opening has a diameter that is at least 50% larger than a diameter of the second opening.

20. The oil tank assembly of claim 17, wherein the upper portion of the oil tank consists of one opening having a diameter greater than ½ inch.

* * * * *